United States Patent [19]

Chen

[11] Patent Number: 5,353,615

[45] Date of Patent: Oct. 11, 1994

[54] AUTOMOBILE STEERING LOCK

[76] Inventor: Tian-Yuan Chen, 95-4, Min-Hsiang Street, Chung-Ho, Taipei Hsien, Taiwan

[21] Appl. No.: 133,917

[22] Filed: Oct. 12, 1993

[51] Int. Cl.$^5$ ............................................. B60R 25/02
[52] U.S. Cl. ........................................ 70/209; 70/226
[58] Field of Search .................. 70/209, 211, 212, 225, 70/226, 237, 238

[56] References Cited

U.S. PATENT DOCUMENTS

| | | | |
|---|---|---|---|
| 4,829,797 | 5/1989 | Wu | 70/226 X |
| 4,959,981 | 10/1990 | Davidson | 70/238 |
| 5,025,646 | 6/1991 | Waguespack, Jr. | 70/238 |
| 5,097,685 | 3/1992 | Lien | 70/226 X |
| 5,163,309 | 11/1992 | Wu | 70/209 |
| 5,168,732 | 12/1992 | Chen et al. | 70/209 |
| 5,199,284 | 4/1993 | Lin | 70/209 |

FOREIGN PATENT DOCUMENTS

WO91/08127 6/1991 PCT Int'l Appl. ................. 70/238

*Primary Examiner*—Lloyd A. Gall

[57] ABSTRACT

An anti-theft device for attachment of a steering wheel comprising an elongate plate member having a lateral opening for a portion of a steering wheel to fit therein and covered immovable by a swingable cap pivotally connected with the plate member and the plate member lying on an upper surface of a gauge panel of an automobile to keep a steering wheel unrotatable, the swingable cap having a vertical rod with grooves to selectably engage with a locating bolt to keep the cap unswingable so as to prevent the device from being taken off the wheel, the locating bolt being in a locked position by an actuator of a lock engaging the locating bolt.

1 Claim, 7 Drawing Sheets

AUTOMOBILE STEERING LOCK

BACKGROUND OF THE INVENTION

A conventional automobile steering lock shown in FIGS. 1 and 2 comprises an elongate tubular member 10, an elongate rod member 16 to telescope in the tubular member 10, a steel ball 11, a spring 12, a stopper 13 and a lock 14 as main components. The elongate rod member 16 has a hook 160 fixed at one end to hook on a portion of a steering wheel of an automobile, and a plurality of annular grooves 161. The elongate tubular member 10 also has a hook 15 to hook a portion of the steering wheel.

In using this conventional lock, it is placed on a steering wheel, hooking the hook 15 around a portion of the wheel, then the lock 14 is unlocked to let the elongate rod member 16 extend outward to hook the hook 160 on an inner side portion of the wheel. After that, the lock 14 is locked again, keeping the steel ball 11 engaged in one of the grooves 161 to keep the elongate rod member 16 immovable, i.e locking this lock on the wheel, preventing the wheel from being rotated by the elongate tubular member 10.

The conventional automobile steering lock has the following disadvantages.

1. In order to fix it on a steering wheel, two hooks 15, 160 have to be formed on the elongate tubular member 10 and the elongate rod member, and the grooves 161 have to be provided in the elongate rod member 16, to a resultant high cost.

2. The elongate tubular member 10 still cannot prevent a steering wheel from rotation completely, as the tubular member 10 extends to a leg of a driver or near a windshield.

3. The lock has to be locked or unlocked every time to apply it on a steering wheel or to take it off the wheel, very inconvenient.

SUMMARY OF THE INVENTION

This invention has been devised to offer a kind of automobile steering lock to have the following desirable advantages.

1. It takes little time to apply this lock on a steering wheel of an automobile.

2. It has a locating rod 53 provided with a plurality of grooves, applicable to various sizes of steering wheels.

3. It has a swingable cap to keep a steering wheel immovable, impossible to fall off from an elongate plate member, very safe to use.

4. It can hold a steering wheel firmly and stably, leaving no room for the steering wheel to rotate.

5. Its components are simple, easy to make, and possible to be locked on a steering wheel without using a key to unlock it first.

DETAILED DESCRIPTION OF THE INVENTION

Figure 1:
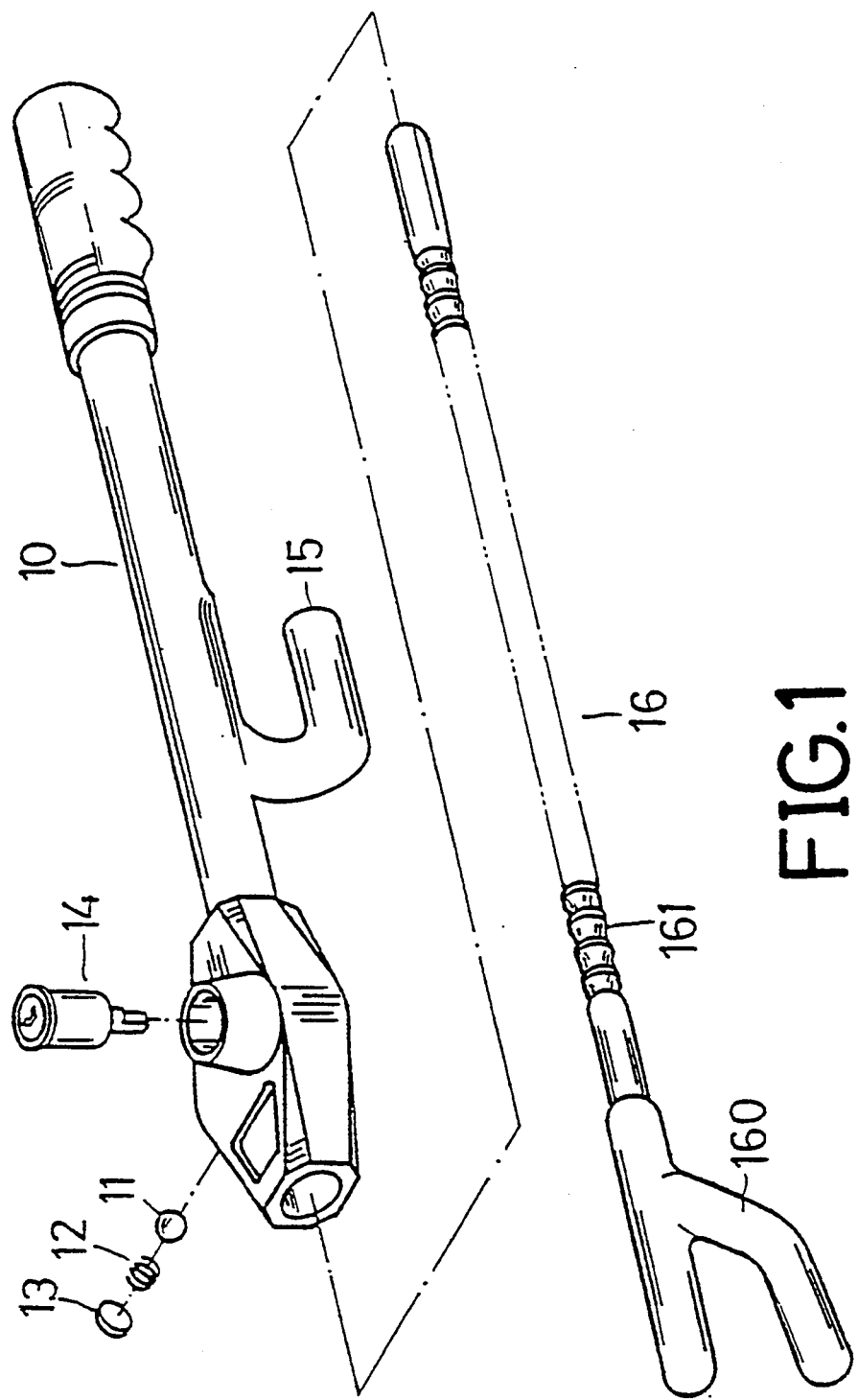
FIG. 1 is an exploded perspective view of a conventional automobile steering lock.
Figure 2:
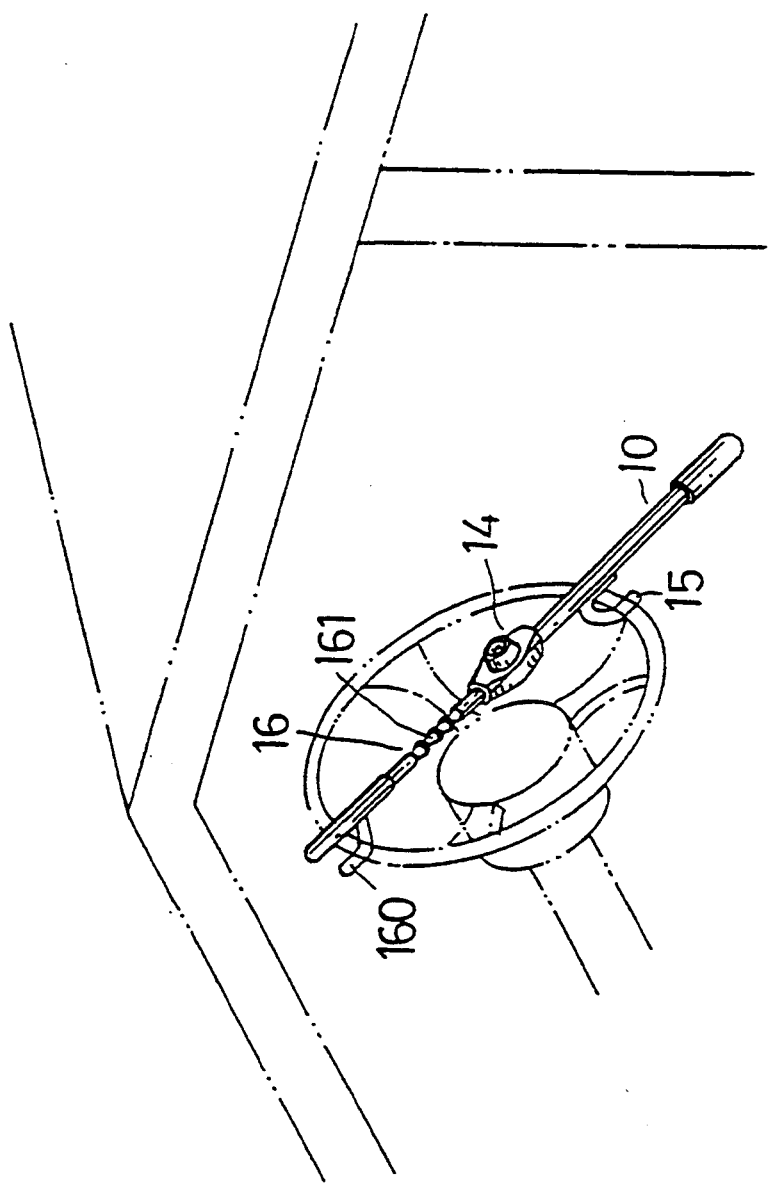
FIG. 2 is a perspective view of the conventional automobile steering lock applied to lock a steering wheel of an automobile.
Figure 3:
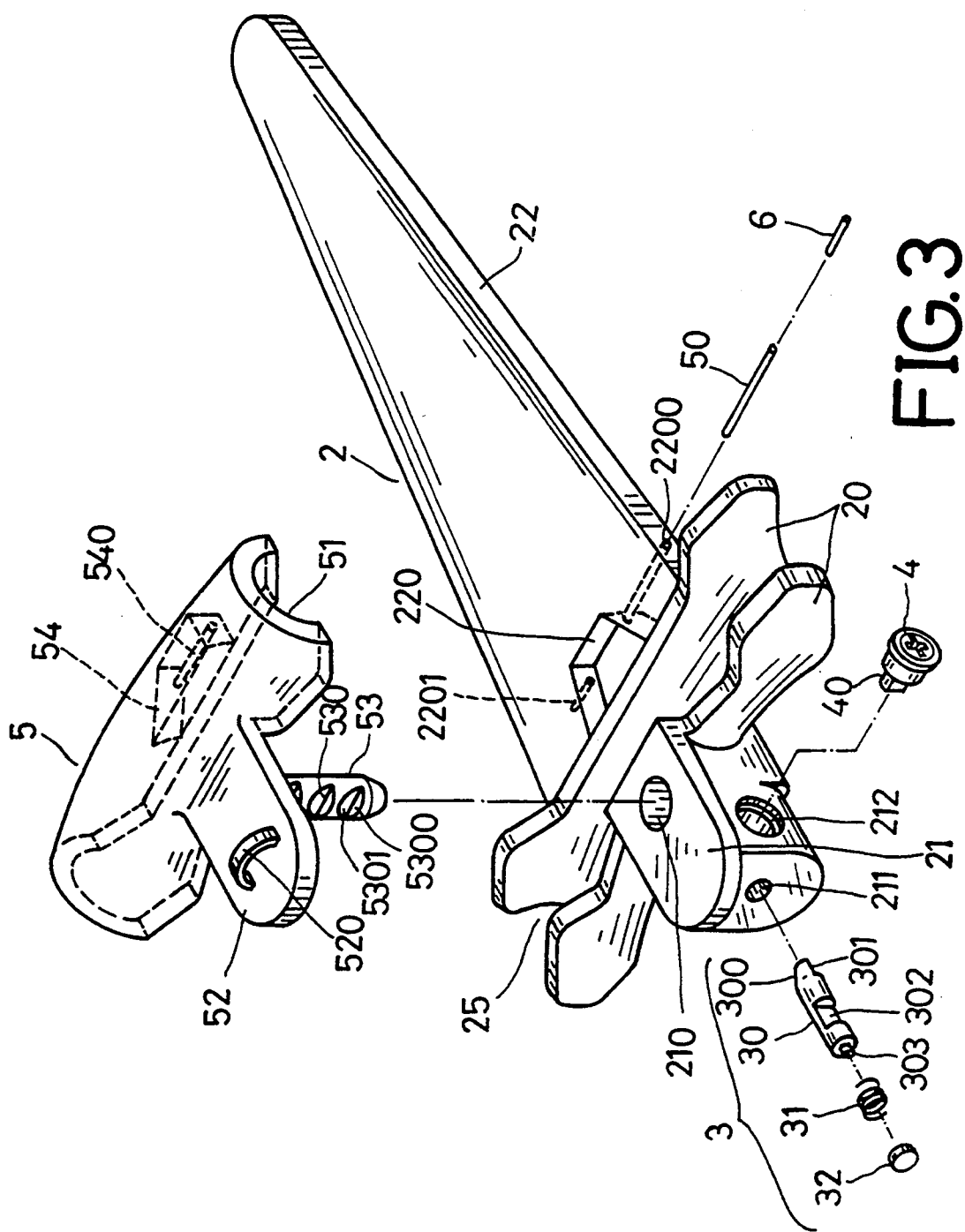
FIG. 3 is an exploded perspective view of an automobile steering lock in the present invention.

An automobile steering lock in the present invention, as shown in FIG. 3, comprises an elongate plate member 2, a lock base 21, a locating member 3, a lock 4, and a swingable cap 5 as main components.

The elongate plate member 2 has two front lateral vertical plates 20, 20 spaced apart to define a lateral opening 25, the opening 25 being open on three sides but closed at a lower side by the elongate plate member 2 for a portion of a steering wheel of an automobile to fit therein, an elongate flat plate 22 extending rearward from a rear front lateral vertical plate 20, and the elongate flat plate having a width gradually narrowing to the rear portion, and a trapezoidal hole 220 in a front portion of the elongate flat plate 22, a lateral through hole 2200 extending from a right side to the trapezoidal hole 220 of the plate 22, and a non-through hole 2201 extending from a left side of the trapezoidal hole 220 to a left side of the plate 22 aligning to the through hole 2200 for a pivot pin 50 and a rivet pin 6 to fit therein for pivotally connecting the swingable cap.

The lock base 21 is connected with an intermediate portion of front vertical lateral plate 20 of the elongate plate member 2, having a horizontal through hole 211 extending from the front side to the rear side, a vertical through hole 210 extending from an upper surface near the rear side to the bottom, and a lateral lock hole 212 in a right side, and the three holes 210, 211, 212 cross with each other in a right angle.

The locating member 3 fits in the horizontal through hole 211 of the lock base 21, having a locating bolt 30, a spring 31 and a stopper 32. The locating bolt 30 has a sloped surface 300 in one side of an inner end portion and a L-shaped surface 301 in the other side of the inner end portion, a flat recess 302 in an intermediate portion, and a projection 303 on a front end surface for a spring 31 to fit around. The stopper 32 is fixed in an opening of the horizontal through hole 211 of the lock base 21, urging the spring 31 inward.

The lock 4 is fixed in the lock hole 212 of the lock base 21, having a semi-circular actuator 40 extending from a bottom to fit in the recess 302 of the locating bolt 30 and to move the bolt 30 back and forth.

The swingable cap 5 is pivotally connected with the flat plate 22 of the elongate plate member 2, having a curved-up portion 51 to cover the two parallel vertical plates 20, 20 and the lateral opening 25 defined by the plates 20, 20, a flat plate portion 52 extending from a front middle side of the curved portion 51. The flat plate portion 52 has a curved-up grip 520 on an upper surface for gripping the swingable cap 5 in swinging it up or down, and a vertical position rod 53 extending down from a lower surface of the plate portion 52. The vertical position rod 53 has several grooves 530 spaced apart in an upright line, and each groove 530 has a lower horizontal surface 5300 and an upper sloped surface 5301, to engage with the sloped surface 300 and the L-shaped surface 301 of the bottom end of the locating bolt 30. A trapezoidal block 54 is fixed on an inner surface of the curved portion 51, having a lateral through hole 540, and fitting in the trapezoidal hole 220 of the elongate plate member 2, and a pivotal pin 50 is provided to fit in the through hole 2200 of the plate member 2, the through hole 540 of the trapezoidal block 54 and the non-through hole 2201, and then a rivet pin 6 is fixed in the outer portion of the through hole 2200, preventing the pivot pin 50 from loosening off to hold the pin 50 in place.

Figure 4:
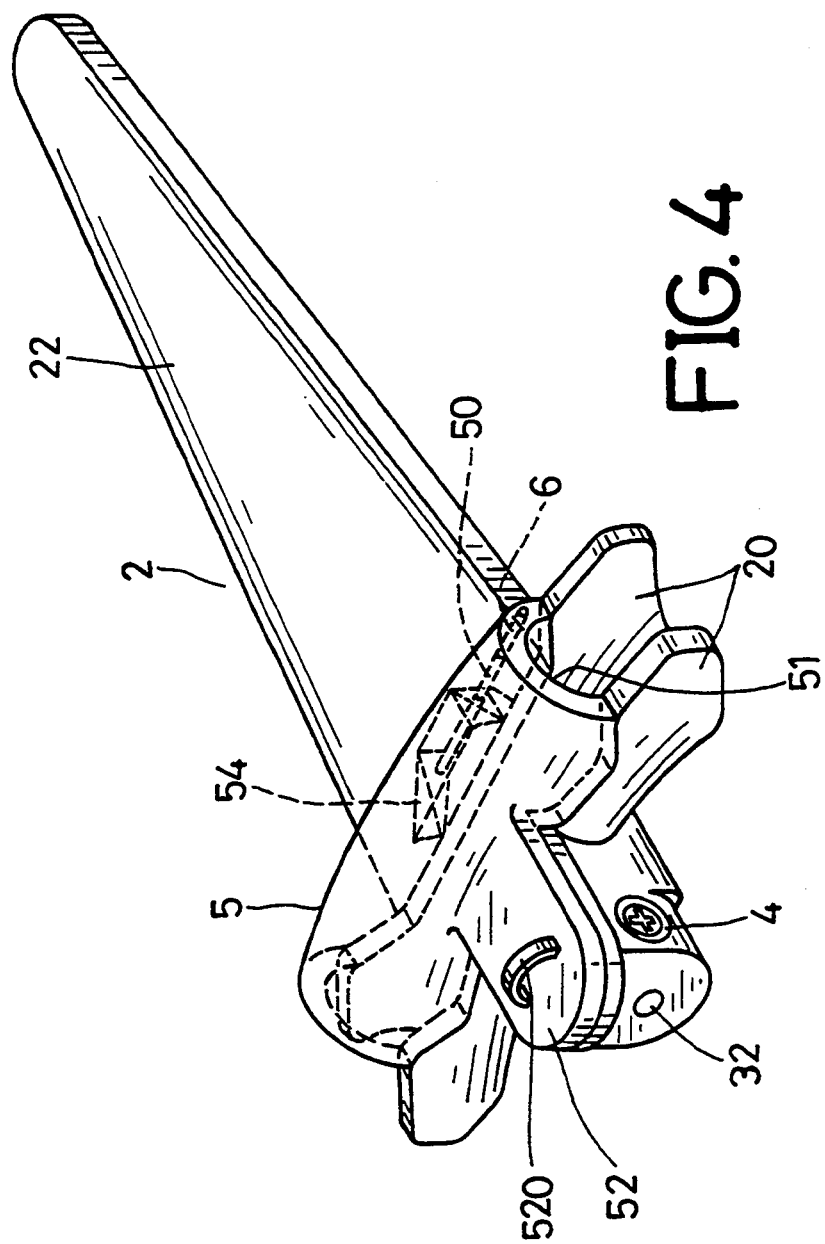
FIG. 4 is a perspective view of the automobile steering lock in the present invention.

In assembling, as shown in FIGS. 3, 4, first the locating bolt 30 and the spring 31 are orderly inserted in the through hole 211, and then the stopper 32 is fixed firmly in the opening of the hole 211. Next, the lock 4 is fitted in the lock hole 212, letting the semi-circular actuator 40 fit in the recess 302 of the locating bolt 30, and then the swingable cap 5 is connected with the elongate plate 22 by the pin 50 so as to be swingably covered on the front lateral opening 25 of the elongate plate member 2 and the lock base 21, letting the trapezoidal block 54 fit in the trapezoidal hole 220 of the plate 22, and then the pin 50 is inserted through the through hole 2200 and the through hole 540 of the block 54 to extend in the non-through hole 2201 and finally the rivet pin 6 is fixed in the outer portion of the through hole 2200 to keep the pivot pin 50 in the holes 2200, 540 and 2201 for good as shown in FIG. 4.

Figure 5:
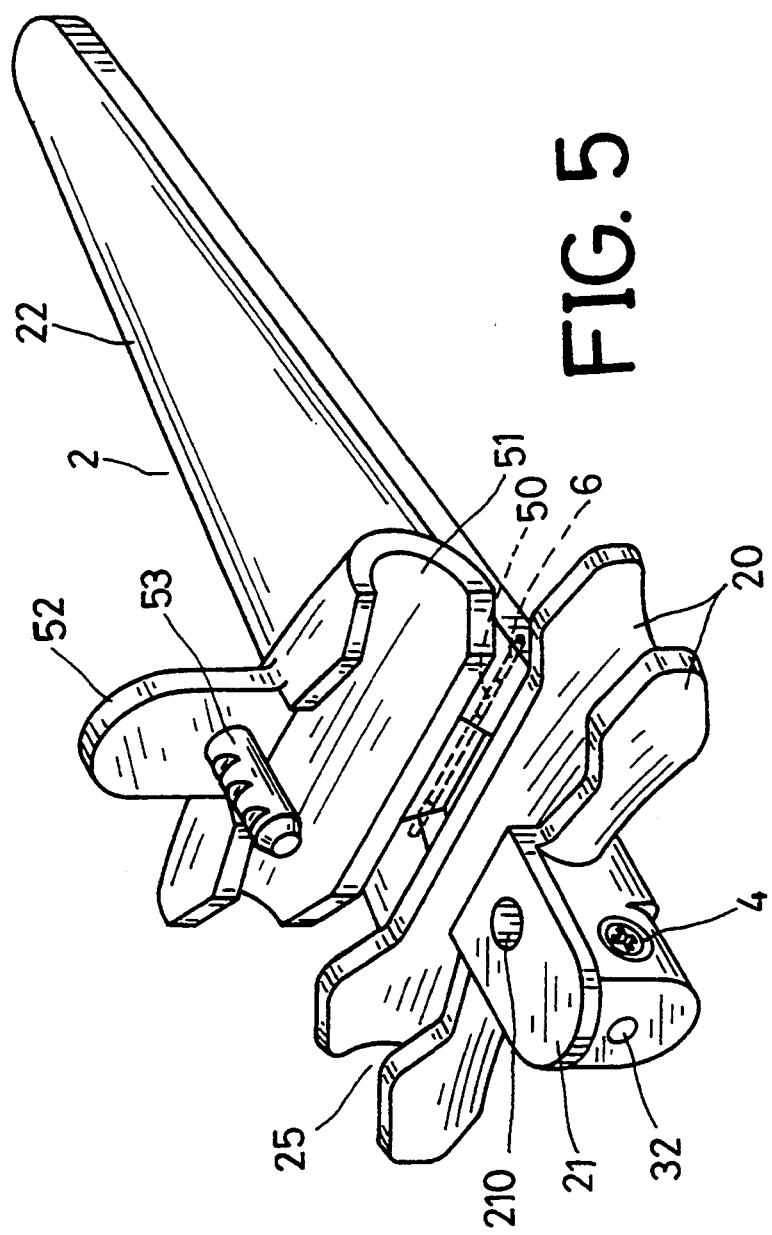
FIG. 5 is a perspective view of a swingable cap swung up in the automobile steering lock in the present invention.
Figure 6:
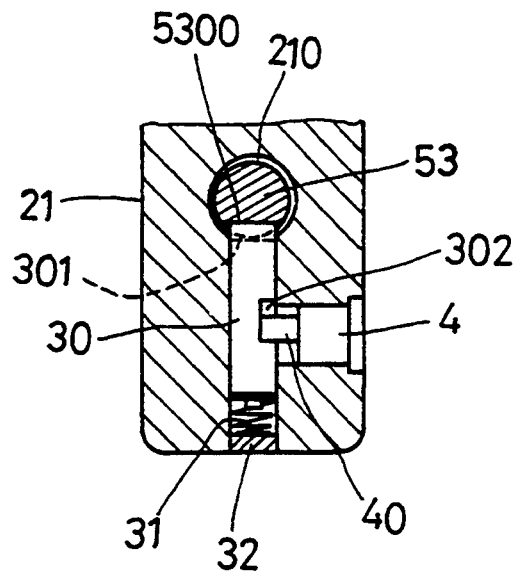
FIG. 6 is a cross-sectional view of the automobile steering lock in locked condition in the present invention.
Figure 7:
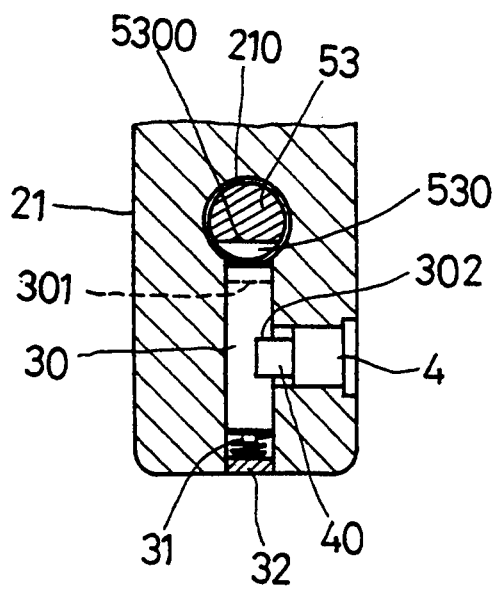
FIG. 7 is a cross-sectional view of the automobile steering lock in unlocked condition in the present invention.
Figure 8:
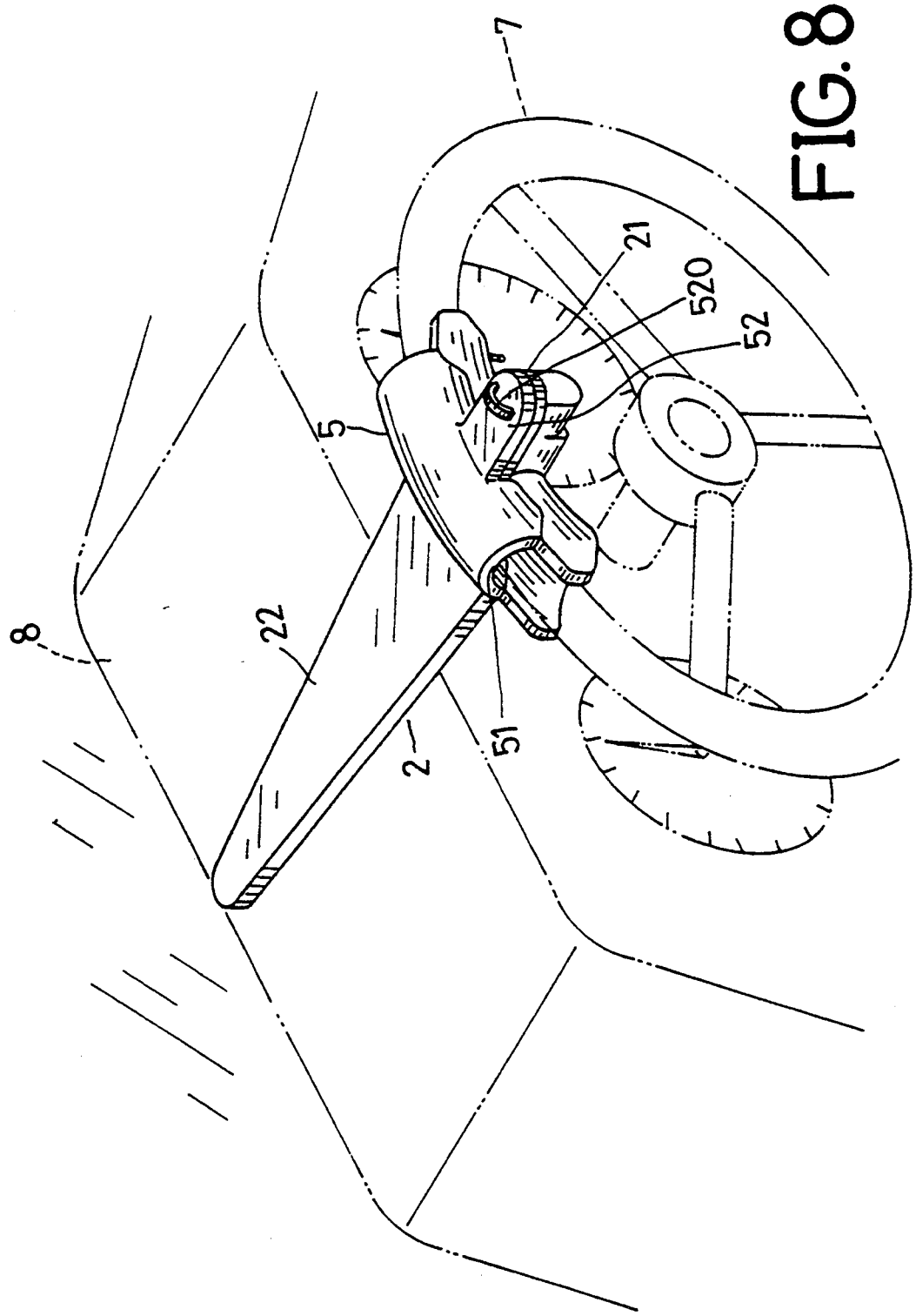
FIG. 8 is a perspective view of the automobile steering lock applied to lock a steering wheel of a car in the present invention.

In using this lock to keep a steering wheel of an automobile from being rotated, as shown in FIGS. 6, 8 the elongate plate member 2 is combined with a portion of the steering wheel 7, letting the portion of the wheel 7 fit in the lateral opening 25 from under, and letting the elongate plate 22 lie on an upper surface of a gauge panel 8. Then the swingable cap is swung down from the position shown in FIG. 5 to the position shown in FIG. 4, letting the vertical locating rod 53 insert down in the vertical hole 210 of the lock base 21 as shown in FIG. 6, and forcing the locating bolt 30 to slide so that one of the grooves 530 of the locating rod 53 may engage the sloped surface 300 and the L-shaped surface 301 to lock the swingable cap 5 with the lock base 21, preventing the cap 5 from swinging up or prying open when the curved portion 51 and the two vertical plates 20, 20 firmly surround the portion of the steering wheel 7. Thus, the swingable cap 5 and the elongate plate member 2 catch hold of a portion of the steering wheel 7, with the plate 22 closely lying on the gauge panel, hampering the steering wheel 7 from being rotated, preventing the car from being stolen.

What is claimed is:

1. An anti-theft device for attachment of a steering wheel to an automobile comprising;

an elongate plate member having (1) two parallel lateral vertical plates spaced apart to define a lateral opening for a portion of a steering wheel of an automobile to fit therein and (2) a flat elongate plate extending rearward from a hind one of said two parallel lateral vertical plates and gradually narrowing to a rear end, having a trapezoidal hole in a front portion for a trapezoidal block of a swingable cap to fit therein;

a lock base connected with a front one of said two parallel lateral vertical plates of said elongate plate member, having (1) a vertical hole near said front lateral vertical plate, (2) a longitudinal through hole extending from a front side to a rear side, and (3) a lock hole in a right side for a lock to fit therein, said vertical hole, said longitudinal through hole and said lock hole crossing one another in a right angle;

a locating member inserting in said longitudinal through hole, having (1) a locating bolt, (2) a spring and (3) a stopper, said locating bolt having a sloped surface at one side of an inner end, an L-shaped surface at another side of the inner end, a flat recess in an intermediate portion, and a projection on an outer end surface for said spring to fit around the projection, and said stopper fitting firmly in an opening of said longitudinal through hole to keep the locating bolt and the spring in said hole;

a lock fitting in said lock hole, having a semi-circular actuator extending rearward to fit in said recess of said locating bolt to move said locating bolt backward and forward so that the inner end of said locating bolt may engage one of grooves of a locating rod to lock a swingable cap immovable;

a swingable cap covering on said lateral opening defined by said two parallel lateral vertical plates and on said lock base, having (1) a curved portion to cover on said lateral opening, and (2) a flat portion extending forward from said curved portion to cover on said lock base, said curved portion having a trapezoidal block fixed on an inner side to fit in the trapezoidal hole in said elongate plate of said elongate plate member, a lateral through hole provided in said trapezoidal block to communicate with a lateral through hole in said elongate plate and a non-through hole of said elongate plate in a straight line, a pivot pin inserting through said lateral through hole of said elongate plate, said lateral through hole in said trapezoidal block and through said non-through hole of said elongate plate to function as a pivot to enable said swingable cap to swing up and down to open or close said lateral opening of said plate member;

a locating rod fixed on a lower surface of said flat portion of said swingable cap, extending down to fit in said vertical hole in said lock base, and having a plurality of grooves spaced apart in a straight line, each said groove having a lower horizontal surface and an upper inclined surface; and said swingable cap being swung upward to a unlocked position so as to allow a portion of a steering wheel to fit in said lateral opening of said elongate plate member, then said swingable cap being swung down to cover on said portion of the steering wheel and said two lateral vertical plates, said lock being in a locked condition, forcing said semi-circular actuator to rotate to lock said locating bolt with its inner end to engage one of said grooves of said locating rod preventing said locating rod together with the swingable cap from being pulled up, said elongate plate being extended on an upper surface of a gauge panel of an automobile to prevent the steering wheel from being rotated after this lock is locked.

* * * * *